United States Patent [19]

Ayala et al.

[11] Patent Number: 5,139,982
[45] Date of Patent: Aug. 18, 1992

[54] SUPPORTED METAL OXIDE CATALYSTS FOR THE SIMULTANEOUS REMOVAL OF $NO_x$ AND $SO_x$ FROM GAS STREAMS

[75] Inventors: Raul E. Ayala, Clifton Park; Josephine Sykes, Scotia, both of N.Y.

[73] Assignee: General Electric Company, Schenectady, N.Y.

[21] Appl. No.: 725,857

[22] Filed: Jul. 2, 1991

[51] Int. Cl.⁵ .............................. B01J 21/18
[52] U.S. Cl. .................... 502/182; 502/159; 502/200; 502/305; 502/309; 502/350; 502/353
[58] Field of Search ............. 502/159, 182, 200, 305, 502/309, 350, 353

[56] References Cited

U.S. PATENT DOCUMENTS

| | | | |
|---|---|---|---|
| 3,796,549 | 3/1974 | Hall | 23/277 C |
| 4,152,296 | 5/1979 | Okabe et al. | 502/350 |
| 4,469,662 | 9/1984 | Hamada et al. | 423/235 |
| 4,621,072 | 11/1986 | Arntz et al. | 502/504 |
| 4,742,037 | 5/1988 | Baiker et al. | 502/247 |
| 4,782,039 | 11/1988 | Lindsey | 502/304 |
| 4,789,533 | 12/1988 | Baiker et al. | 423/239 |
| 4,812,296 | 3/1989 | Schmelz et al. | 502/211 |

FOREIGN PATENT DOCUMENTS 5511020 1/1980 Japan .
2207818 8/1990 Japan .

*Primary Examiner*—Patrick P. Garvin
*Assistant Examiner*—Brent M. Peebles
*Attorney, Agent, or Firm*—James R. McDaniel; James C. Davis, Jr.; Paul R. Webb, II

[57] ABSTRACT

This invention describes the preparation and use of metal oxide catalysts supported on titanium dioxide, hydrophobic or polymeric substrates for the removal of $NO_x$ and $SO_x$ from gas streams such as flue gases and combustion exhaust gases.

17 Claims, 4 Drawing Sheets

SUPPORTED METAL OXIDE CATALYSTS FOR THE SIMULTANEOUS REMOVAL OF $NO_x$ AND $SO_x$ FROM GAS STREAMS

CROSS REFERENCE TO A RELATED APPLICATION

This application is related to commonly assigned U.S. Pat. application Ser. No. 07/725,095 (RD-21,058), entitled "A Low Temperature Supported Metal Oxide Catalytic $NO_x$ and $SO_x$ Removal System for Retrofit to Wet Flue Gas Desulfurization Systems".

BACKGROUND OF THE INVENTION

1. Field of the Invention

This invention relates to supported metal oxide catalysts for use in pollution control systems. Such structures of this type generally eliminate substantially all the $NO_x$ and $SO_x$ contained within the gas streams typically exhausted from a coal burning furnace.

2. Description of the Related Art

Selective catalytic reduction, hereinafter referred to as SCR, has been used to remove $NO_x$ from gas streams exhausted from a coal furnace by injecting a reducing agent, usually ammonia ($NH_3$), in the presence of an oxide catalyst, such as vanadium oxide. Vanadium oxide supported on inert substrates containing titanium dioxide ($TiO_2$) has been found to catalyze the reduction of NO to nitrogen and water and also react with $SO_2$ under the same conditions. While the dual purpose makes vanadium catalysts desirable for pollution control, these prior pollution control systems suffer from at least two drawbacks.

First, a reducing agent such as ammonia must be injected into the system in order to decompose the $NO_x$. However, not all the ammonia injected into the system reacts with the $NO_x$. The unreacted ammonia, which can reach concentrations as high as 50 ppm in the exhaust gas, is usually expelled into the atmosphere typically as ammonia leakage and this is highly undesirable.

Second, the gas streams leaving the coal furnace contain water in the form of stream. The steam adsorbs onto the substrate and deactivates the catalyst with a typical catalyst being deactivated by 10-50% within one day of operating when the steam concentration in the gas stream is greater than 5% v/v. Deactivation by water occurs because the $TiO_2$ substrate has a high affinity for water, i.e., is hydrophilic. Therefore, a more advantageous system, then, would be presented if such amounts of unreacted ammonia and deactivation of the catalyst could be reduced.

It is apparent from the above that there exists a need in the art for a pollution control system which reduces the amount of $NO_x$ and $SO_x$ pollution being exhausted into the atmosphere, and which at least equals the $NO_x$ and $SO_x$ pollution control of the prior art systems, particularly those of the SCR type, but which at the same time substantially reduces the ammonia leakage and the water or steam deactivation of the catalyst. It is a purpose of this invention to fulfill this and other needs in the art in a manner more apparent to the skilled artisan once given the following disclosure.

SUMMARY OF THE INVENTION

Generally speaking, this invention fulfills these needs by providing a catalyst for the removal of $NO_x$ and $SO_x$ from gas streams, comprising a substrate having first and second sides, a layer of a metal salt having first and second sides such that said first side of said layer is adjacent to said second side of said substrate and said layer having ammonia absorbed substantially within said metal salt layer.

In certain preferred embodiments, the substrate can be constructed of hydrophilic materials, such as $TiO_2$, or hydrophobic materials such as activated carbon, carbonaceous materials or polycarbonate materials. Also, the metal salt layer can be made of ammonium metavanadate ($NH_4VO_3$) or a chromium-based metal oxide ($Cr(NO_3)_3 \cdot 9H_2O$). Finally, the ammonia is added to the ammonium metal salt layer to assist in activating the ammonium metal salt layer.

In another further preferred embodiment, the metal oxide catalyst substantially eliminates all of the $NO_x$ and $SO_x$ contained within the gas stream.

The preferred $NO_x$ and $SO_x$ pollution control system, according to this invention, offers the following advantages: good stability; improved durability; excellent $NO_x$ and $SO_x$ pollution reduction; good economy; and high strength for safety. In fact, in many of the preferred embodiments, these factors of durability and $NO_x$ and $SO_x$ pollution reduction are optimized to an extent considerably higher than heretofore achieved in prior, known $NO_x$ and $SO_x$ pollution control systems.

BRIEF DESCRIPTION OF THE DRAWINGS

The above and other features of the present invention which will become more apparent as the description proceeds are best understood by considering the following detailed description in conjunction with the accompanying drawings wherein like characters represent like parts throughout the several views and in which.

DETAILED DESCRIPTION OF THE INVENTION

Figure 1:
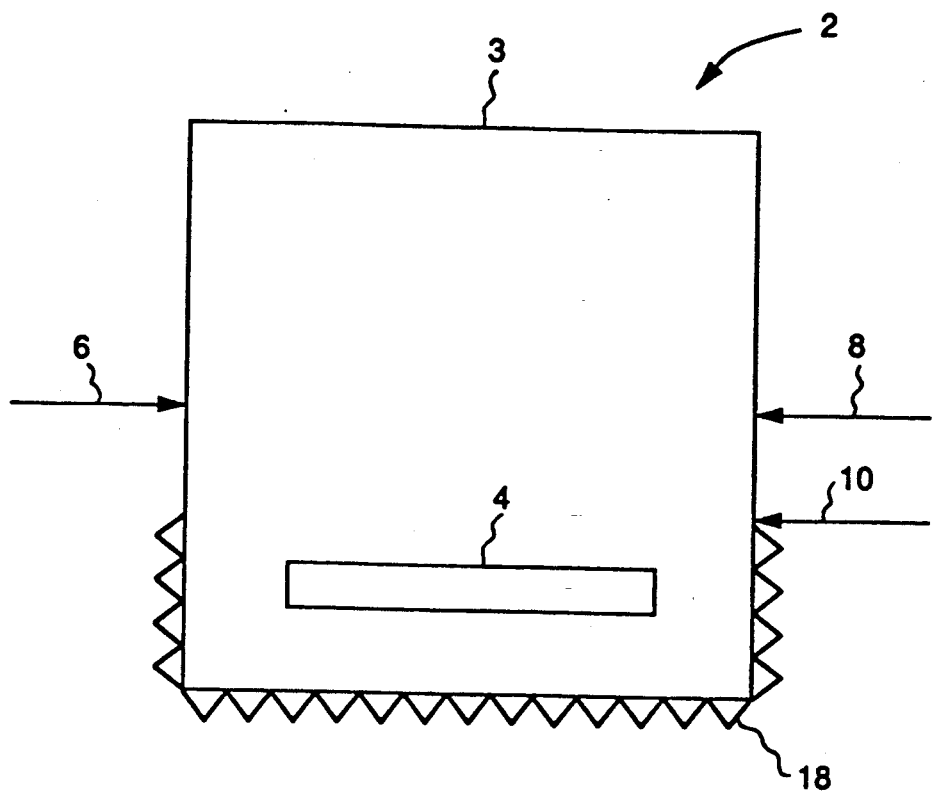
FIG. 1 is a schematic representation of the catalyst coating apparatus, according to the present invention.

With reference first to FIG. 1, there is illustrated a catalyst coating apparatus 2. Apparatus 2 includes enclosure 3, injection port 6, preferably, used for introducing ammonium metal salts such as ammonium metavanadate ($NH_4VO_3$) into enclosure 3, injection port 8, preferably, used for introducing nitrogen and oxygen ($N_2$ and $O_2$) into enclosure 3, and injection port 10, preferably, used for introducing ammonia ($NH_3$) into enclosure 3.

Substrate 4 which can be constructed of $TiO_2$, activated carbon carbonaceous materials, or polycarbonate materials is placed in apparatus 2 so substrate 4 can be coated. It is to be understood that the substrate can also be a high surface area powder in which case a support structure in the shape of a flat plate or honeycomb pattern is needed for added mechanical strength. The role of the substrate is to synergistically interact with the metal so as to result in catalytic activity greater than metal and substrate acting separately.

Substrate 4 is coated with an ammonium metal salt layer 14 (FIG. 2) and substrate 4 and layer 14 are dried in air at a temperature of less than 100° C. After layer 14 and substrate 4 are dried, they are put back into enclosure 3 and a gas mixture of 5% oxygen in nitrogen are introduced into enclosure 3 through port 8. Next, ammonia ($NH_3$) is placed into enclosure 3 such that the $NH_3$ absorbs itself into layer 14 to create a molecular layer 14 having molecules 16 of $NH_3$.

Figure 2:
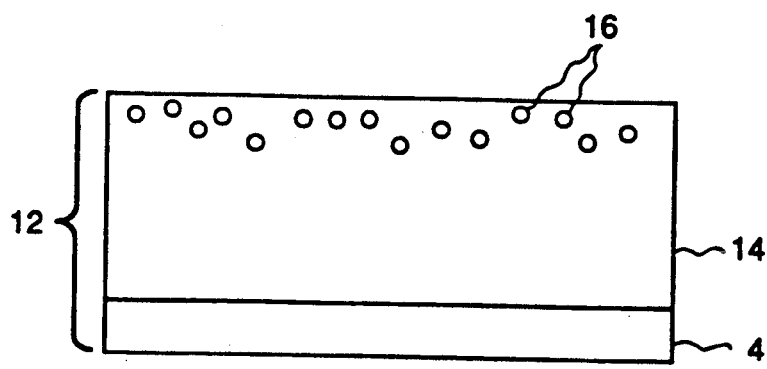
FIG. 2 is a schematic representation of a cross-section of the catalyst prepared according to the present invention.

With reference to FIGS. 1 and 2, the specific structure of the preferred catalyst 12 will be discussed with reference to the following example.

EXAMPLE 1

Substrate 4, preferably constructed of $TiO_2$, is placed inside enclosure 3. Substrate 4 is then wet impregnated by conventional wet impregnation techniques with a solution of an ammonium metal salt, preferably, ammonium metavanadate ($NH_4VO_3$). The $NH_4VO_3$ is introduced through port 6. It is to be understood that if $TiO_2$ is used as the substrate, the solution should be a water solution but if a hydrophobic or a polymeric material is used as the substrate, the solution should be an alcohol/water solution.

After substrate 4 is coated with the ammonium metal salt layer 14 (FIG. 2), substrate 4 and layer 14 are dried in air in a conventional oven (not shown) at a temperature less than 100° C., preferably, 70° C. for at least 8-12 hours or until layer 14 is dried. This drying of the layer 14 causes layer 14 to begin to activate. Once layer 14 and substrate 4 are dried, they are put back into enclosure 3 and a gas mixture of balanced nitrogen and oxygen having a percentage of total volume of the gas of approximately 1-5%, is placed in enclosure 3 through port 8. Substrate 4 is subjected to this nitrogen/oxygen gas mixture at a temperature of less than 200° C., preferably between 150° and 200° for approximately 1 hour. The nitrogen/oxygen gas mixture is heated in enclosure 3 by heaters 18 which, preferably, are conventional heater strips. This step also aids in activating layer 14 by converting the ammonium metal salt into a metal oxide.

Once substrate 4 and layer 14 are sufficiently dried, the ($NH_3$) is introduced into enclosure 3 that already contains the nitrogen/oxygen mixture through port 10. The amount of ammonia added is, preferably, up to 500 ppm. The $NH_3$ absorbs itself into layer 14 to create molecules 16 (FIG. 2). The purpose of layer 14 having molecules 16 is that the $NO_x$ contained within the gas stream will react with molecules layer 16 in situ to substantially decompose the $NO_x$ present in the exhaust gas into nitrogen and water.

After substrate 4 is coated with layer 14, catalyst 12 is formed. Catalyst 12 can then be used to decompose $NO_x$ from a gas stream. In order to further remove $SO_x$ from the gas stream by chemical reaction, additional $NH_3$ must be injected by conventional techniques such as those used in a SCR method into the area near catalyst 12. The preferred concentration of $NH_3$ injected is a concentration which is stoichiometric to the amount of $SO_x$ present in the gas stream with the amount of $SO_x$ being measured by conventional techniques. The preferred amount of $NH_3$ injected into the area around catalyst 12, typically, being approximately 500-2000 ppm.

Figure 3:
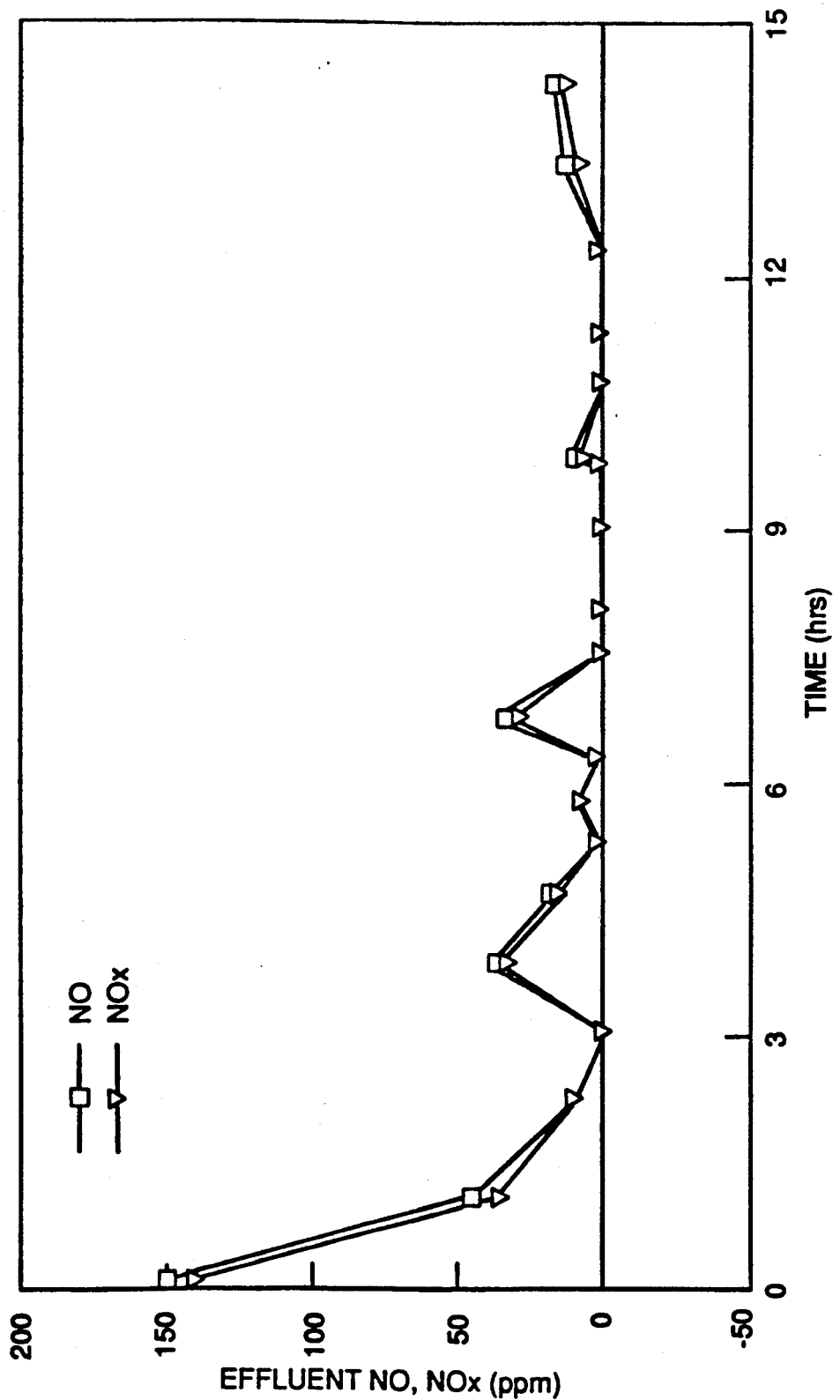
FIG. 3 is a graphical representation of the $NO_x$ removal when using a vanadium catalyst deposited upon a titanium dioxide substrate, according to the present invention.

FIG. 3 shows the removal of effluent NO and $NO_x$ in ppm by a vanadium catalyst supported on a titanium dioxide substrate powder as a function of time in hours. Since the effluent concentrations of NO and $NO_x$ are essentially the same, the catalyst decomposes NO without the formation of other oxides of nitrogen $NO_x$. The inlet gas composition contained 150 ppm NO, 5% oxygen, 150 ppm ammonia, 250 ppm $SO_2$, and balanced nitrogen. During the first hours, the $SO_2$ outlet concentration was 0 ppm as measured at various times using conventional Drager tubes. At least 500 ppm $NH_3$ would have been required to completely remove all NO and $SO_2$ for catalysts prepared under standard procedures such as those used in the prior SCR system and without the $NH_3$ activation step as set forth in the present invention. Eventually outlet $SO_2$ levels increased to 30 ppm with time.

Figure 4:
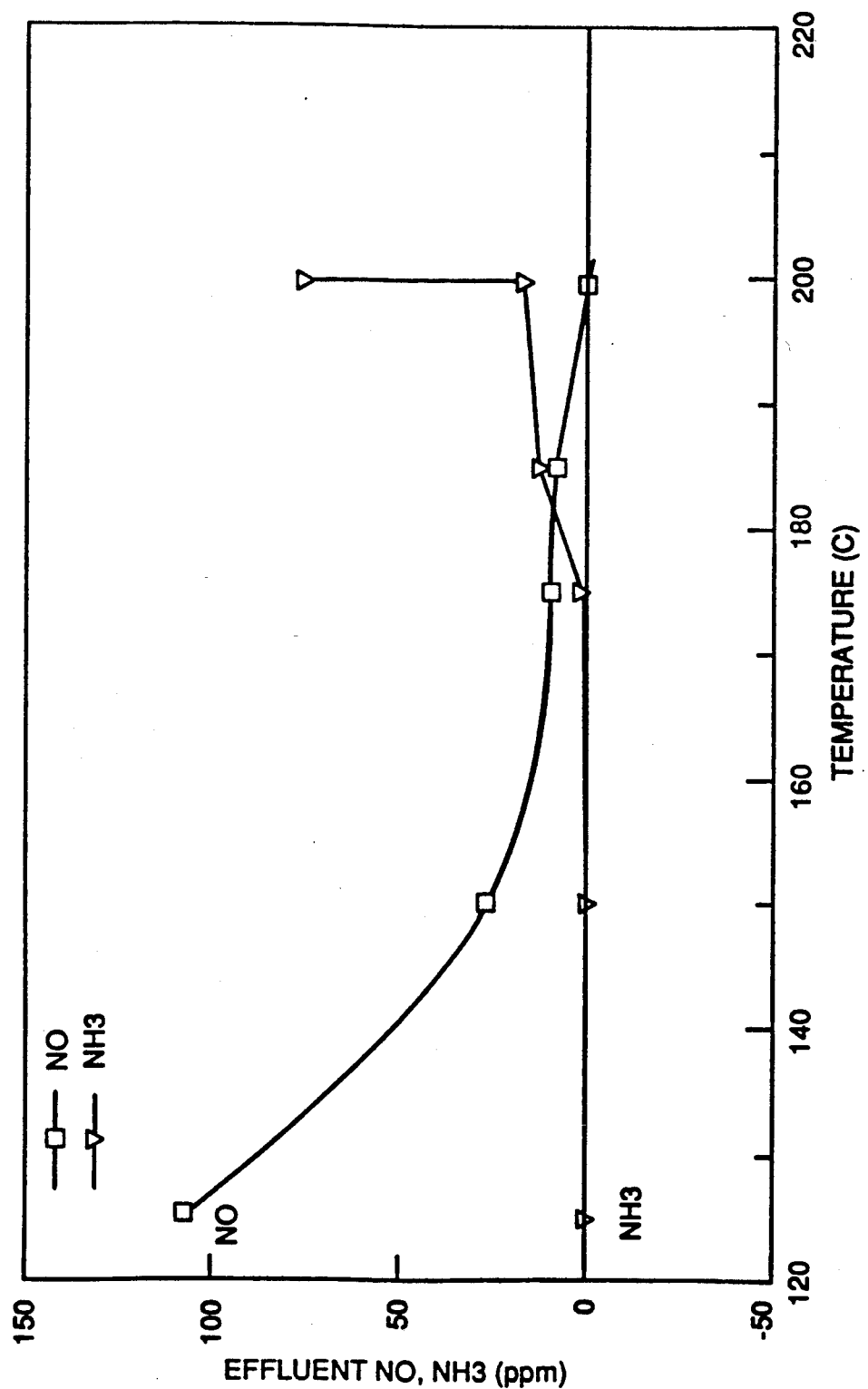
FIG. 4 is a graphical representation of the ammonia leakage observed when using the same catalyst structure as found in FIG. 3.
Figure 5:
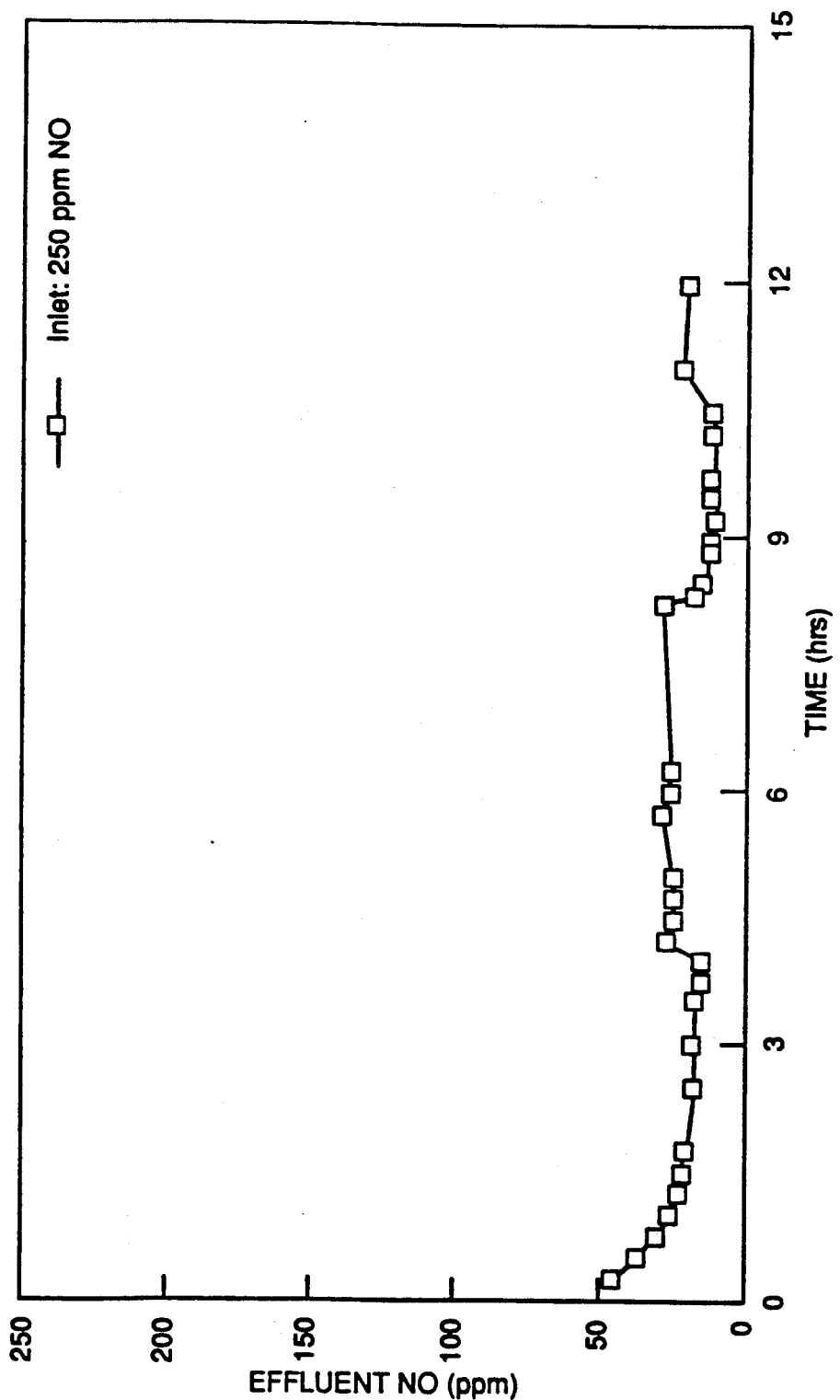
FIG. 5 is a graphical representation of the $NO_x$ removed when using a chromium-based catalyst deposited on a titanium dioxide substrate, according to the present invention.

FIG. 4 shows the ammonia leakage concentration for the same vanadium catalyst as used in FIG. 3. In FIG. 4, effluent NO and $NH_3$ in ppm is plotted against operating temperature in °C. of catalyst 12. No ammonia leakage is observed at lower operating temperatures. Optimum performance is obtained with the catalyst as set forth in the present invention if NO removal is increased while maintaining zero ammonia leakage. FIG. 5 shows an example of the performance of a chromium-based catalyst ($Cr(NO_3)_3 \cdot 9H_2O$), also on a $TiO_2$ substrate, for the removal of NO. The graph plots effluent NO in ppm against time in hours. Although it does not decrease the outlet NO to 0 ppm, the catalyst achieves more than 90% NO removal.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A catalyst for the removal of $NO_x$ and $SO_x$ from gas streams, said catalyst comprised of:
   a substrate having first and second sides; and
   a layer of an ammonium metal salt material having first and second sides such that said first side of said layer is adjacent to said second side of said substrate and said layer having an amount of ammonia absorbed substantially within said second side of said ammonium metal salt material layer.

2. The catalyst, according to claim 1, wherein said substrate is further comprised of:
   titanium dioxide.

3. The catalyst, according to claim 1, wherein said substrate is further comprised of:
   a polymeric material.

4. The catalyst, according to claim 3, wherein said polymeric material is further comprised of:
   polycarbonate material.

5. The catalyst, according to claim 1, wherein said substrate is further comprised of:
   activated carbon.

6. The catalyst, according to claim 1, wherein said substrate is further comprised of:
   carbonaceous material.

7. The catalyst, according to claim 1, wherein said substrate is further comprised of:
   a sheet of material.

8. The catalyst, according to claim 7, wherein said sheet of material is further comprised of:
   a honeycombed sheet.

9. The catalyst, according to claim 1, wherein said substrate is further comprised of:
a powdered material.

10. The catalyst, according to claim 1, wherein said ammonium metal salt is further comprised of:
a vanadium-based metal salt.

11. The catalyst, according to claim 1, wherein said metal salt layer is further comprised of:
a chromium-based metal salt.

12. A method for creating a catalyst used for the removal of $NO_x$ and $SO_x$ from gas streams including a substrate having first and second sides, a metal salt material and ammonia, said method comprising the steps of:
depositing said metal salt material on said second side of said substrate to create a layer of metal salt material;
drying said metal salt material layer,
oxidizing said metal salt layer; and
depositing said ammonia on top of said metal salt material layer to activate said metal salt layer.

13. The method, according to claim 12, wherein said step of depositing said metal salt material is further comprised of the step of:
depositing said metal salt material by wet impregnation techniques.

14. The method, according to claim 12, wherein said step of drying said metal salt material layer is further comprised of the steps of:
drying said metal salt material layer and said substrate in air at approximately 70° C. until said layer is substantially dried; and
drying said metal salt material layer and said substrate in a mixture of nitrogen and oxygen.

15. The method, according to claim 12, wherein said step of depositing said ammonia is further comprised of the step of:
depositing said ammonia in a concentration of approximately up to 500 ppm.

16. The catalyst, according to claim 10, wherein said vanadium-based metal salt is further comprised of:
ammonium metavanadate.

17. The method, according to claim 12, wherein said step of depositing said ammonia on top of said metal salt material layer to activate said metal salt layer is further comprised of the step of:
depositing said ammonia at a temperature of less than 200° C.

* * * * *